Nov. 20, 1928.
W. S. THAYER
DISHPAN
Filed Dec. 19, 1927
1,692,003
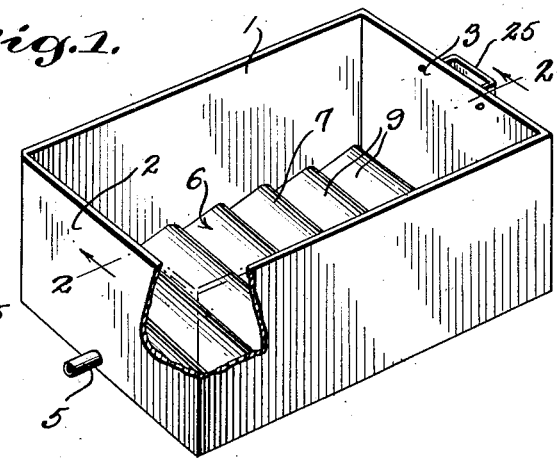
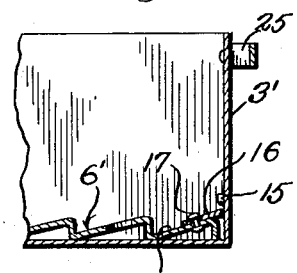
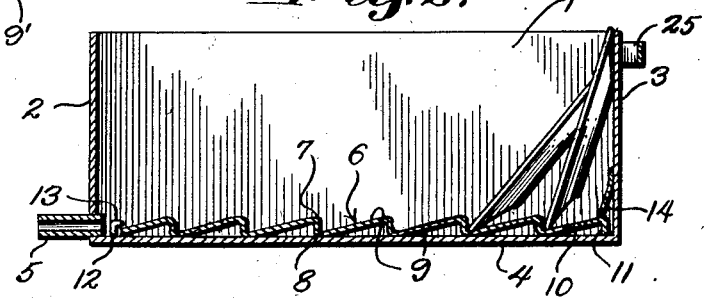
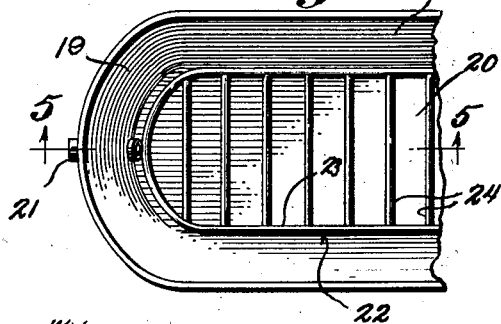
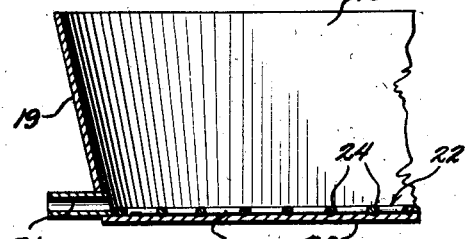
WILLIAM S. THAYER.

Patented Nov. 20, 1928.

1,692,003

UNITED STATES PATENT OFFICE.

WILLIAM S. THAYER, OF SCOTIA, NEW YORK.

DISHPAN.

Application filed December 19, 1927. Serial No. 241,235.

This invention relates to improvements in dish pans and more particularly to a pan designed for use in scalding and drying washed dishes, and one of the objects of the present invention is to provide a pan for the purpose stated so constructed that dishes disposed therein may be readily and conveniently subjected to the action of hot water in a most thorough manner, provision being made for draining the water from the pan after it has passed over the surfaces of the dishes to be scalded.

Another object of the invention is to provide a dish pan of the character referred to in which novel means is provided, in the bottom of the pan, for so supporting the dishes, disposed within the pan, that the dishes will be presented at such an angle to the flow of scalding water poured into the pan, as to insure of a thorough scalding and cleansing of the surfaces of the dishes as the water flows in the direction of the length of the pan and before its passage from the pan through the drain.

Another object of the invention is to provide, in a pan of the character referred to, means for supporting the dishes in the manner stated, which means will be extremely simple in construction and capable of being readily bodily removed from the pan and replaced therein, so that it may be individually cleaned and all accumulations of food particles effectually removed from its surfaces.

Another object of the invention is to provide a dish pan of the character described which will be extremely simple in its construction and inexpensive to manufacture, so that the pan will be available to those who cannot afford more expensive types of apparatus for this purpose, the construction of the pan, however, being such that the scalding and draining operation may be carried out as effectually, by the use thereof, as by more expensive scalding and draining devices and apparatuses which are now in use.

Another object of the invention is to provide a dish pan for the purpose stated so constructed that two of the pans may be arranged side by side upon the drain board of a sink, thus permitting the washed dishes to be placed in one pan, while other previously washed and arranged dishes, may be removed from the other pan and dried by wiping.

While the accompanying drawings and the description which is to follow, constitute a disclosure of the preferred embodiment of the invention, it will be understood that various changes may be made within the scope of what is claimed.

In the accompanying drawing:

Figure 1 is a perspective view of one form of dish pan embodying the invention;

Figure 2 is a vertical longitudinal sectional view therethrough taken substantially on the line 2—2 of Figure 1;

Figure 3 is a fragmentary view similar to Figure 2 illustrating a modification of the invention;

Figure 4 is a fragmentary top plan view illustrating another form of pan;

Figure 5 is a longitudinal sectional view therethrough taken substantially on the line 5—5 of Figure 4.

In the embodiment of the invention illustrated in Figures 1 and 2 of the drawing, the pan is of oblong rectangular form and preferably of sheet metal and comprises side walls 1, front and rear walls 2 and 3, and a bottom 4, a short length of pipe 5 being secured in an opening in the front wall 2 of the pan close to the bottom 4 of the pan and constituting a drain spout through which the water may drain from the pan.

In order that the dishes to be scalded and dried may be supported within the pan in a position to facilitate the scalding and drying thereof, a false bottom 6 is arranged within the pan and is preferably formed from an integral sheet of metal of marginal dimensions to adapt it to be removably disposed within the pan and to extend substantially over the entire bottom surface of the pan. This false bottom or more specifically the sheet of metal comprising the same, is formed at intervals with parallel, transversely extending bends 7 and 8 which are located relatively close to each other and the formation of which results in inclined supporting portions 9 which extend in a series throughout the length of the said false bottom and upon which the dishes to be scalded and dried are disposed. By reference to Figures 1 and 2 of the drawings and particularly the latter figure, it will be observed that the supporting portions 9 of the false bottom are inclined upwardly between the bends 8 and 7, and in the direction of the rear end wall 3 of the body of the pan, so that dishes disposed upon these supporting portions will be suitably inclined, and therefore when scalding water is poured into the pan near the rear end thereof, the pan being supported upon the inclined drain board of a sink, with its drain nozzle 5 projecting over the sink, the water will flow downwardly through the pan and will circulate over all portions of the surfaces of the dishes arranged within the pan upon the said inclined supporting portions of the bottom thereof, the water draining through the spout 5 and into the sink. In order that complete drainage may be insured, it is preferable that one of the supporting portions 9 terminate at its forward edge at the upper surface of the bottom 4 and immediately in rear of the intake end of the drain spout 5 as clearly shown in Figure 2 of the drawing.

As above stated, the false bottom 6 is bodily removable from the pan and replaceable therein and therefore it is susceptible of a thorough cleansing before it is replaced in the pan, and in order to permit of convenient removal of the said bottom and its replacement, a finger opening 10 is preferably formed in one of the inclined supporting portions 9 of the said false bottom.

In order that the false bottom may be effective, throughout its entire length, in supporting dishes in inclined position within the pan, the rearmost one of the inclined supporting portions 9 is preferably arranged to extend in upwardly inclined position in the direction of the rear end wall 3 of the pan body, and the upper edge of this portion is supported by the formation of a downwardly projecting flange 11 at said edge, which flange rests at its lower edge upon the bottom 4 of the pan body.

In order that the false bottom 6 may be securely retained in place and prevented from becoming dislodged from the pan, a retaining member 12 is preferably provided upon the upper side of the bottom 4 of the pan at the forward end thereof and includes an overhanging portion 13 beneath which the forward edge of the false bottom may be engaged when the false bottom is introduced into the pan, and a leaf spring 14 is secured at its upper end to the inner side of the rear wall 3 of the pan body and the lower portion of the spring is normally sprung outwardly from the said wall 3 in the manner clearly shown in Figure 2 so that the lower end of this portion will engage above the rear end of the false bottom 6, it being understood that, when it is desired to remove the false bottom, this may be readily accomplished by pressing inwardly against the spring 14 to cause the same to lie flat against the inner surface of the rear wall 3 of the pan body, whereupon the finger of either hand may be engaged in the finger opening 10 in the false bottom and the rear end of the false bottom lifted and its forward end disengaged from beneath the overhanging portion 13 of the retaining element 12.

Figure 3 of the drawing illustrates a similar arrangement in which a stop or keeper member 15 is fixed upon the inner side of the rear wall 3' of the pan body, and a latch 16 is swiveled at one end as at 17 upon the upper side of the rearmost supporting portion 9' of the false bottom 6' and is engageable beneath the said detent 15 so as to retain the false bottom in place, the forward end of the false bottom being held in place by the same means as shown in Figure 2. In this embodiment of the invention the latch 16 may be swung about its pivot 17 so as to lie within the bounds of the rear end of the false bottom and thus be disengaged from the keeper lug 15, whereupon the false bottom may be lifted from the pan in the manner previously described.

From the foregoing description of this embodiment of the invention it will be evident that the pan is of exceptionally simple and inexpensive construction and likewise, due to the contour of the body of the pan, two of the pans may be arranged in side by side relation upon the inclined drain board of a sink, so that the dishes which are first washed may be placed in one of the pans, and removed therefrom by the one drying the dishes by wiping, while other dishes are being washed and arranged in the other pan. It will also be evident that due to the peculiar formation of the false bottom of the pan, the dishes disposed upon said bottom will be supported in a position to be most thoroughly cleansed by the scalding water poured into the pan.

In the embodiment of the invention illustrated in Figures 4 and 5 of the drawings, the body of the pan is of somewhat different contour from the body of the pan shown in Figures 1 and 2, in that the side walls thereof, indicated by the numeral 18, are inclined upwardly, and the end walls, indicated by the numeral 19, are likewise inclined upwardly and are curved, substantially on the arc of a circle, to extend between the ends of the said side walls 18. The pan of this embodiment likewise includes a bottom 20 which is of such marginal contour as to conform to the shape of the side walls 18 and end walls 19. The pan, in this embodiment, is provided with a drain spout 21 corresponding to the drain spout 5 of the pan shown in Figures 1 and 2.

The false bottom of the pan shown in Figures 4 and 5, and which is indicated by the numeral 22, differs from the false bottom of the pan shown in Figures 1 and 2, in that it comprises a frame 23 which is of wire, and transverse members 24, also of wire, which extend between the opposite sides of the frame in spaced relation to one another, the ends of the frame 23 being curved to conform to the curvature of the end walls 19 of the body of the pan, and the side members of the said frame 23 being in spaced parallel relation to each other to extend along the opposite sides of the bottom 20 of the pan. It will be evident that in the embodiment shown in Figures 4 and 5, the dishes to be scalded and dried may be supported in an inclined position if they are so disposed as to rest upon the bottom 20 of the body of the pan and, at their portions which engage the said bottom, are disposed in engagement with one of the cross members 24 of the false bottom 22, and are also disposed to rest upon the next adjacent cross member.

It will be understood of course that, if desired, the pan body shown in Figures 4 and 5 of the drawings may be of the oblong rectangular contour possessed by the body shown in Figures 1 and 2, and the false bottom shown in Figures 4 and 5 may be appropriately formed to fit within the pan, and, on the other hand, the end walls of the pan body shown in Figures 1 and 2 may be of curvilinear, rather than straight form, if desired.

As illustrated in Figures 1, 2 and 3 of the drawing, a handle 25 may be provided at the top of the rear wall 3 or 3' of the pan body to permit of more convenient handling of the pan and likewise to provide means whereby the pan may be hung upon a nail or the like, when not in use, and it will be evident at this point that due to the provision of the means for holding the false bottom of the pan within the pan, the bottom will be prevented from falling from the pan when the pan is suspended by engaging its handle with a nail or other suspension element.

Having thus described the invention, what I claim is:

1. A device for holding dishes for scalding and drying comprising a pan having a drain at one end, and a false bottom within the pan comprising a metal sheet having a series of supporting portions formed therein and inclined in the direction of the other end of the pan for supporting dishes in position inclined toward the last mentioned end of the pan.

2. A device for holding dishes for scalding and drying comprising a pan having a drain at one end, and a false bottom within the pan comprising a sheet of material of approximately the same marginal contour as the bottom of the pan, the said sheet having a plurality of parallel bends therein defining a series of dish supporting portions inclined upwardly toward the other end of the pan.

3. A device for holding dishes for scalding and drying comprising a pan having a drain at one end, means within the pan for supporting dishes in position inclined toward the other end of the pan, the said means comprising a false bottom having dish supporting portions arranged in a series throughout the length of the bottom, a retaining member upon the bottom of the pan beneath which one end of the false bottom is removably engaged, and coacting means upon the opposite end wall of the body and the said false bottom for retaining the said end of the false bottom in place upon the bottom of the pan.

4. A device for holding dishes for scalding and drying comprising a pan having a drain at one end, means within the pan for supporting dishes in position inclined toward the other end of the pan, the said means comprising a false bottom having dish supporting portions arranged in a series throughout the length of the bottom, a retaining member upon the bottom of the pan beneath which one end of the false bottom is removably engaged, and a leaf spring upon the inner side of the other end wall of the body of the pan and sprung outwardly from said wall to engage at its end against the upper side of the corresponding end of the false bottom to retain the bottom in place within the pan.

In testimony whereof I affix my signature.

WILLIAM S. THAYER.